Figures 1, 2:
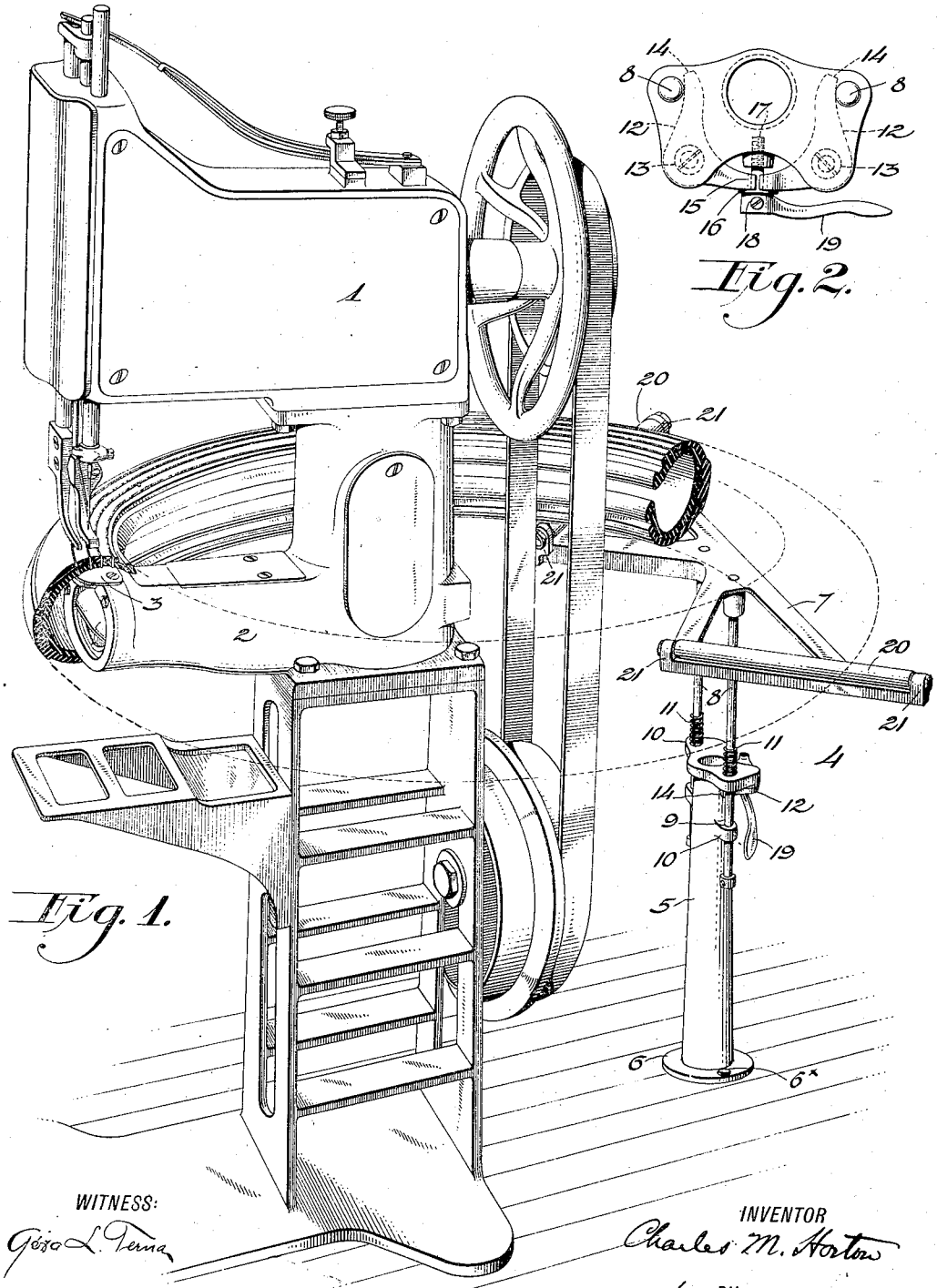

C. M. HORTON.
MECHANISM FOR FASTENING TOGETHER NESTED TIRE CASINGS.
APPLICATION FILED OCT. 3, 1916.

1,327,237.

Patented Jan. 6, 1920.

WITNESS:

INVENTOR
Charles M. Horton
BY
Henry J. Miller
ATTORNEY

UNITED STATES PATENT OFFICE.

CHARLES M. HORTON, OF ELIZABETH, NEW JERSEY, ASSIGNOR TO THE SINGER MANUFACTURING COMPANY, A CORPORATION OF NEW JERSEY.

MECHANISM FOR FASTENING TOGETHER NESTED TIRE-CASINGS.

1,327,237.   Specification of Letters Patent.   Patented Jan. 6, 1920.

Application filed October 3, 1916. Serial No. 123,582.

*To all whom it may concern:*

Be it known that I, CHARLES M. HORTON, a citizen of the United States, residing at Elizabeth, in the county of Union and State of New Jersey, have invented certain new and useful Improvements in Mechanism for Fastening Together Nested Tire-Casings, of which the following is a specification, reference being had therein to the accompanying drawings.

This invention relates to an apparatus for utilizing used tire casings by which a plurality of casings may be secured together with suitable fastenings producing a reinforced casing capable of further service.

In making a useful shoe from two or more used casings it is obviously necessary to nest them together. It is difficult if not impossible to nest a casing within another in its usual commercial form owing to the relatively small diameter across the clencher-beads. This difficulty has been overcome by cutting off one or both beads of a casing. It is also difficult to handle an annular body like a tire casing and secure it together with any known fastening mechanism. This latter difficulty is overcome by supporting the tire casing around a fastening mechanism in a plane at right angles to a plane in which a needle or other suitable fastening implement is actuated and so that the force of gravity acts upon the casing without substantial deformation of its annular form.

My invention has for its objects to provide suitable work-supporting mechanism in connection with the fastening mechanism, preferably a sewing machine, for securing together such casings.

To the attainment of these ends I sever a bead or beads from one or more casings, nest within it or them another casing having beads, position the nested casings in the path of a fastening mechanism, and secure the parts together. To support the work I provide the horn or tubular arm of the machine with an elevated portion shaped to permit the tire to be tilted transversely of the path of the needle, and in conjunction therewith, I make use of a vertical standard in which slide two rods fixed to and supporting a bracket or frame carrying two friction rollers inclined to each other in the same plane. The vertical standard is placed in line with the longitudinal axis of the horn to the right of the machine when viewed from the front. The rods carrying the frame and sliding in the standard may be clamped in any adjusted position by suitable means such as two pivoted fingers engaged by a collar or washer on a screw-stud, which is provided with a handle for facilitating advancement of the collar or washer to effect a binding engagement of the finger ends with the slide rods.

The invention also consists in certain details of construction which will appear in the following description of the device illustrated in the accompanying drawings, in which Figure 1 is a view in perspective of a No. 98–3 Singer sewing machine and Fig. 2 is a detail of the adjusting mechanism for a supporting frame looking down on the vertical standard.

The fastening mechanism, preferably a sewing machine, as shown in the drawings at 1, is provided with a rigid or fixed work-supporting arm 2, usually known as a horn, which contains a lower thread mechanism that coöperates with the needle. Any suitable form of actuating mechanism may be employed to operate the needle and the lower thread mechanism and no detailed illustration or description thereof is deemed necessary.

The horn is preferably provided with a raised portion shaped to conform substantially with the tire casing at its free end indicated at 3, the object of the elevation at this point being to permit a canting of the internally supported annular casing about the end of the horn as a pivot above or below the plane of the tire when horizontal in order to locate the fastenings either close to the bead or well up on the sides of the shoe. In the machine illustrated, the portion 3 is raised above the upper surface of the horn about 1½ inches.

Coöperating with the horn to support the tire casing is an additional or second work-supporting means, indicated generally by 4, located preferably in line with and to the right of the sewing machine. This additional or second work-supporting means may consist of a vertical standard 5 provided with a floor-flange 6 affording a suitable base and a bracket or frame 7 adjustably connected therewith. Through the flange 6 screws 6ˣ may be passed to firmly hold the standard in any desired position in fixed spaced relation from the sewing machine. The adjustable connection of frame 7 to standard 5 may obviously be of any old and well known form but preferably as shown consists of two parallel slide-rods 8 symmetrically disposed in holes 9 provided in spaced lugs 10 integral with the vertical standard 5 against which the frame 7 carried by the slide-rods is cushioned from shock by a pair of coiled springs 11. These slide-rods may be clamped in any adjusted position by means of oppositely disposed L-shaped fingers 12 pivoted at 13 to the standard intermediate their ends in such fashion that one end 14 of a finger will bear against the rod and the other end 15 against a collar or washer 16 on a screw-stud 17 to which is secured by a set-screw 18 a handle 19 for facilitating advancement of the collar or washer. The bracket or frame 7 may be of any suitable shape but as shown is cast in the form of a huge letter K and disposed at its ends are antifriction means for diminishing the drag imposed by the weight of the casings upon the feeding mechanism which rotates the work. Preferably as shown the anti-friction means consist of rollers 20 journaled in lugs 21 cast with the frame, the lugs being so arranged that the rollers converge in the same plane toward each other.

In the making of a reinforced tire casing a bead or beads is or are cut off from one or more used casings with any suitable implements or mechanism, the beadless casing or casings is or are then stretched over another casing having beads, and thus nested, the casings are placed in the path of a needle or other suitable mechanism for inserting fastenings. Preferably the nested casings are placed around the sewing machine being internally supported by the horn and externally supported by the radially arranged rollers on the frame. Nested casings supported in this manner are as shown rotatable by the feeding mechanism about an axis which passes approximately through the upright standard of the sewing machine. It is obvious that the casing may be supported so that this axis of rotation is on the opposite side of the needle from that shown or in various other locations. The preferred arrangement is that shown in the drawings because it enables the operator to readily handle the casings, to have access to the stitching point, and because it takes up a minimum of floor space while utilizing the force of gravity to loosely hold the tire in position upon the supporting means without substantial deformation of its normal shape. Thus positioned, i. e., thus placed over and around the machine and supported in place, the machine is operated to stitch or otherwise suitably fasten the casings together and the fastenings located well up on the sides of the tire or close to the beads by properly adjusting the frame carrying the rollers as has been previously described.

It is to be understood that by the term "bead" I mean that portion of the casing or shoe which lies adjacent the felly of the wheel which is engaged by fastening means to secure the casing to the wheel.

It is to be understood also that my invention is not confined to the specific construction illustrated in the drawings except as it may be restricted by the terms of the claims. The principle in "positioning" the casings is obviously available for use with a fastening mechanism placed on its side with the casings in a vertical plane or with the machine at an angle but the arrangement shown I deem preferable.

While a sewing machine is shown and described it is obvious that any other suitable fastening mechanism could be used, but I deem a sewing machine to be preferable for the class of work mentioned.

Having thus set forth the nature of the invention, what I claim herein is:—

1. The combination with a fastening mechanism for securing together nested tire casings, of work-supporting means sustaining the nested casings internally and externally.

2. The combination with a fastening mechanism for securing together nested tire casings, of work-supporting means sustaining the nested casings internally and externally at separated points.

3. The combination with a fastening mechanism for securing together nested tire casings, of work-supporting means arranged at different elevations whereby the nested casings may be held in a substantially horizontal plane.

4. The combination with a fastening mechanism for securing together nested tire casings, of work-supporting means including a fixed element and an adjustable element, whereby nested casings may be held in a horizontal plane or in planes inclined to the horizontal for enabling the insertion of fastenings at different distances from the beaded portions of nested tire casings.

5. The combination with a fastening mechanism for securing together nested tire casings, of work-supporting means including a fixed support and a second support spaced therefrom for sustaining the casings.

6. The combination with a fastening mechanism for securing together nested tire casings, of work-supporting means including a horn and a second support disconnected therefrom.

7. The combination with a fastening mechanism for securing together nested tire casings, of work-supporting means including a horn having a raised portion at its free end, and additional supporting means.

8. The combination with a fastening mechanism for securing together nested tire casings, of work-supporting means including a horn shaped to conform to the interior of the tire casing, and additional supporting means.

9. The combination with a fastening mechanism for securing together nested tire casings, of work-supporting means adapted to sustain nested casings at three or more spaced points whereby a tire may be held in a plane.

10. The combination with a fastening mechanism for securing together nested tire casings, work-supporting means for sustaining an annular body in a plane including a rigid support, and a second support spaced therefrom and having anti-friction sustaining means on its upper surface.

11. In combination with a sewing machine having a needle and coöperating under-thread mechanism, work-supporting means including a horn carrying the under-thread mechanism, and a standard having an adjustable supporting portion.

12. In combination with a sewing machine having a needle and coöperating under-thread mechanism, work-supporting means including a horn, and a standard disconnected therefrom and having a manually adjustable supporting portion.

13. In combination with a sewing machine having a needle and coöperating under-thread mechanism, work-supporting means including a rigid horn, and an independent standard having an adjustable portion, and means for clamping said portion in any adjusted position.

14. The combination with a needle and coöperating under-thread mechanism, of work-supporting means including a horn carrying the under thread mechanism, and a standard having an adjustable supporting portion, rollers mounted on said adjustable supporting portion and converging toward each other in the same plane.

15. In combination with a sewing machine having a horn for supporting nested tire casings at one point, additional work-supporting means sustaining the nested casings at two spaced points on opposite sides of the longitudinal axis of the horn.

16. The combination with a sewing machine having a vertical standard, an overhanging arm, and a work-support shaped to extend internally of nested annular tire-casings, of additional work-supporting means disposed in a circle inclosing the vertical standard whereby annular casings may be supported in a circle embracing the vertical standard while being stitched.

17. A sewing machine whose frame comprises a vertical standard overhanging arm and a horn spaced from and substantially parallel with said overhanging arm and having a raised free end adapted to fit within tire casings, and having stitch-forming mechanism including a needle operatively supported in said overhanging arm, in combination with a plurality of work-supporting devices disposed about the vertical standard, said work-supporting devices and the free end of said horn being disposed in a circle which embraces the vertical standard.

18. In combination, a sewing machine having a frame, a work-supporting horn sustained at one end by the frame and being free at its other end, a standard arranged beyond the sustained end of the horn and a plurality of work-supporting devices carried thereby and together with the free end of the horn defining a planar support for annular articles.

19. The combination with a fastening mechanism for securing together nested tire casings of work-supporting means adapted to sustain the nested tire casings circumferentially at a plurality of points in position to be fastened together.

In testimony whereof, I have signed my name to this specification.

CHARLES M. HORTON.